United States Patent
Fujii et al.

(10) Patent No.: US 11,665,805 B2
(45) Date of Patent: May 30, 2023

(54) LIGHTING DEVICE

(71) Applicant: KOITO ELECTRIC INDUSTRIES, LTD., Shizuoka (JP)

(72) Inventors: Tadashi Fujii, Aichi (JP); Hideto Sanui, Aichi (JP); Jun Ito, Aichi (JP); Hajime Suzuki, Aichi (JP); Youmei Kaminaga, Shizuoka (JP); Takayuki Izumi, Shizuoka (JP); Kazuo Maruyama, Shizuoka (JP)

(73) Assignee: KOITO ELECTRIC INDUSTRIES, LTD., Shizuoka (JP)

( * ) Notice: Subject to any disclaimer, the term of this patent is extended or adjusted under 35 U.S.C. 154(b) by 163 days.

(21) Appl. No.: 16/979,286

(22) PCT Filed: Mar. 8, 2019

(86) PCT No.: PCT/JP2019/009410
§ 371 (c)(1),
(2) Date: Sep. 9, 2020

(87) PCT Pub. No.: WO2019/172435
PCT Pub. Date: Sep. 12, 2019

(65) Prior Publication Data
US 2020/0398744 A1 Dec. 24, 2020

(30) Foreign Application Priority Data

Mar. 9, 2018 (JP) .............................. JP2018-043637

(51) Int. Cl.
*H05B 33/08* (2020.01)
*H05B 47/17* (2020.01)
(Continued)

(52) U.S. Cl.
CPC ............... *H05B 47/17* (2020.01); *B60Q 3/43* (2017.02); *B60Q 3/47* (2017.02); *B61D 29/00* (2013.01)

(58) Field of Classification Search
None
See application file for complete search history.

(56) References Cited

U.S. PATENT DOCUMENTS

| 9,877,374 B2 * | 1/2018 | Randolph | H05B 45/20 |
| 2014/0300282 A1 * | 10/2014 | Grave | H05B 45/10 |
| | | | 315/185 R |

(Continued)

FOREIGN PATENT DOCUMENTS

| JP | 2014-120316 A | 6/2014 |
| JP | 2016-203879 A | 12/2016 |

(Continued)

OTHER PUBLICATIONS

International Search Report for PCT/JP2019/009410 issued by ISA/JPO dated Jun. 4, 2019.

*Primary Examiner* — Elmito Breval
(74) *Attorney, Agent, or Firm* — Kubotera & Associates, LLC

(57) ABSTRACT

A lighting device includes an indoor lamp (11), being provided in the cabin of a railroad vehicle (1) in order to wholly irradiate the inside of the cabin over the longitudinal direction of the vehicle, a vehicle body power supply (20), supplying electric power to the indoor lamp (11), and a storage battery (30), being charged with a voltage applied by the vehicle body power supply (20). The indoor lamp (11) includes a general lamp light source (12) and a standby lamp light source (13), being lighted at an illuminance lower than that at which the general lamp light source (12) is lighted, and the general lamp source (12) being supplied with electric power from the vehicle body power supply (20) not (Continued)

through the storage battery (30), while the standby lamp light source (13) being supplied with electric power from the vehicle body power supply (20) through the storage battery (30). In an emergency, electric power is supplied from the storage battery (30) only to the standby lamp light source (13), and the standby lamp light source (13) is continued to be lighted at the low illuminance.

4 Claims, 5 Drawing Sheets

(51) Int. Cl.
*B60Q 3/47* (2017.01)
*B60Q 3/43* (2017.01)
*B61D 29/00* (2006.01)

(56) References Cited

U.S. PATENT DOCUMENTS

2015/0015076 A1\* 1/2015 Park .................. H02J 9/065
307/66
2019/0031029 A1 1/2019 Samejima et al.

FOREIGN PATENT DOCUMENTS

JP 2017-135089 A 8/2017
WO 2012-082082 A2 6/2012

\* cited by examiner

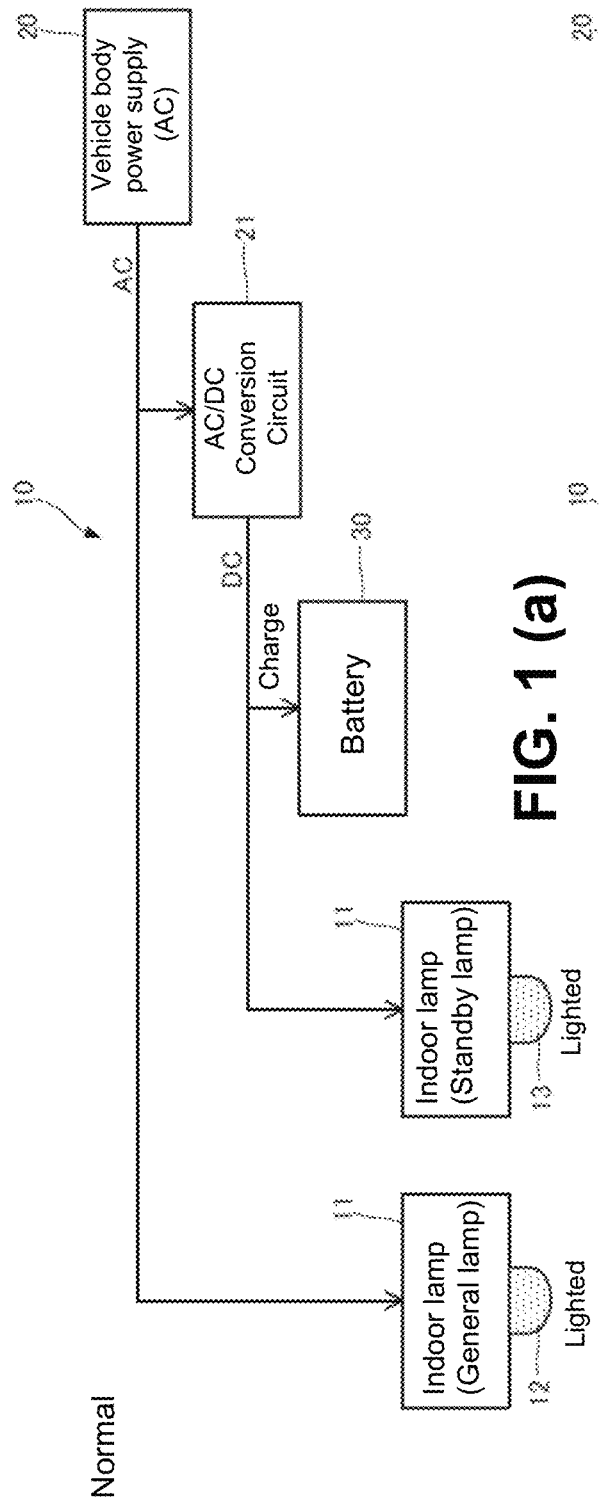
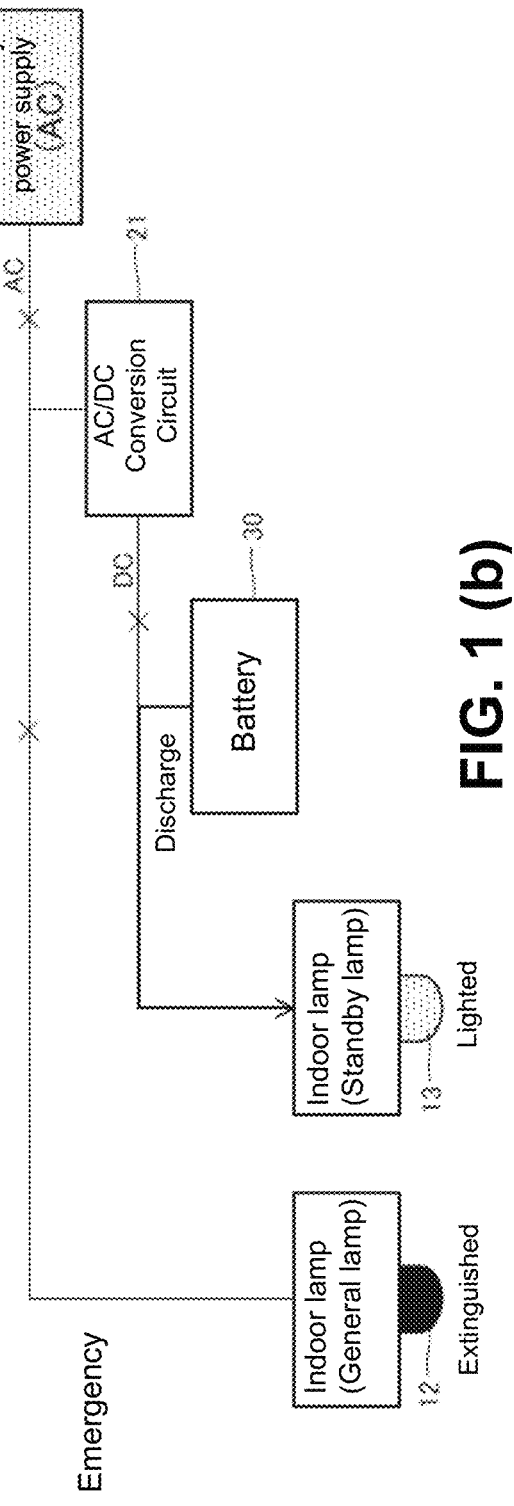
FIG. 1 (a)
FIG. 1 (b)

▬ : Door
▨ : Seat
▫ : Indoor lamp (General lamp)
▨ : Indoor lamp (Standby lamp)

LIGHTING DEVICE

TECHNICAL FIELD

The present invention relates to a lighting device that is loaded in a vehicle for illuminating the inside of a cabin thereof, and particularly to the same that is applied to a railroad vehicle.

BACKGROUND ART

With the conventional lighting device for use in a railroad vehicle, as a plurality of indoor lamps for illuminating the inside of a cabin thereof, there has been provided a standby lamp that is lighted up with a drive circuit being switched over to an on-vehicle battery, in addition to a general lamp that is turned off in an emergency in which power fed to the vehicle is cut off. The standby lamp plays a role for clearly indicating the evacuation route.

As shown in FIG. 4(a), the standby lamp is generally installed in the vicinity of a door, and as shown in FIG. 4(b), in a limited express train, such as the Shinkansen line, it is installed only in the vicinity of a cabin entrance at a vehicle end. Therefore, as shown in FIG. 5(a), in an emergency with a limited express train, the area in the vicinity of the vehicle end is bright, while, the areas other than that are dark, thus the difference in illuminance between the location where a standby lamp is provided and that where it is not provided is large, the passengers in the dark area being not capable of looking their feet at the time of evacuation, thereby the conventional lighting device having had room for improvement of the safety thereof.

Then, in order to solve the above problems, the applicant of the present invention has already proposed a system that comprises at least one battery for each two indoor lamps (a general lamp and a standby lamp) in the different electrical systems, and that, in an emergency, driving of all the indoor lamps is switched over to that from the respective batteries. For example, refer to Patent Document 1. With such a system, by increasing the brightness of the cabin in an emergency, the sense of insecurity of the passengers can be reduced.

CITATION LIST

Patent Literature

Patent Document 1: Japanese Unexamined Patent Application Publication No. 2016-203879

SUMMARY OF THE INVENTION

However, with the conventional technology as described in the above-mentioned Patent Document 1, each one indoor lamp in the two electrical systems is separately provided with a battery, and an extra wiring for connecting the respective batteries is needed. Therefore, the wiring space in the spatially limited cabin is increased, resulting in the possibility of causing an increase in weight and cost, thereby a further measure for improvement having been demanded.

In addition, in an emergency, for each indoor lamp in the two electrical systems, there has been needed an operation for switching over the supply of electric power from the main power supply to the battery and control of it. Further, the power feeding from the battery in an emergency is limited in capacity, and in the case where the failure recovery takes a long period of time, there has been the possibility that lighting of each indoor lamp cannot be maintained. Then, each indoor lamp has been demanded to be of power saving type, whenever possible.

Then, for the general lamp, which is lighted by the battery in an emergency, a control is considered which drives it at a lighting level as low as 70% to 80% of that in the lighting state at the normal time (which is assumed to be 100%) (refer to par. 0100, and others). However, in addition to the need for judging whether or not an emergency state has occurred, an operation for switching over to the lighting level to a lower one on the basis of the result of the judgement and a control of it have been additionally needed, thereby there having been the possibility that a further increase in cost may be caused.

The present invention has been made in view of the above-mentioned problems that are associated with the conventional technology, and is intended to provide a lighting device that is capable of easily securing the required brightness throughout the vehicle in an emergency with a simple and convenient configuration, and is capable of further improving the safety at the time of evacuation with no need for increasing the cost.

The subject matter of the present invention to achieve the above purpose is disclosed in the inventions as stated in the following respective items [1] to [5]:

[1] A lighting device, being loaded in a vehicle to illuminate the inside of a cabin, including:

a lighting fixture, being provided in the cabin of the vehicle in order to wholly irradiate the inside of the cabin over the longitudinal direction of the vehicle, a power supply, supplying electric power to the lighting fixture, and a storage battery, being charged with a voltage applied by the power supply, the lighting fixture including a first light source and a second light source, being lighted at an illuminance lower than that at which the first light source is lighted, the first light source being supplied with electric power from the power supply not through the storage battery, while the second light source being supplied with electric power from the power supply through the storage battery, in an emergency when power fed from the power supply is shut off, electric power being supplied from the storage battery only to the second light source, and the second light source being continued to be lighted at the low illuminance.

[2] The lighting device according to [1], wherein, with the lighting fixture, the irradiation direction of light from the first light source as a main illuminator is specified to be a certain direction, while the irradiation direction of light from the second light source as an auxiliary illuminator is specified to be a direction different from the direction specified for the first light source.

[3] The lighting device according to [1] or [2], wherein the power supply supplies electric power obtained from the outside of the vehicle to loads including the lighting fixture.

[4] The lighting device according to any one of [1], [2], and [3], including a conversion circuit, converting AC electric power from the power supply to output DC power, wherein the storage battery is charged with a DC voltage from the conversion circuit, and the second light source is lighted with the DC voltage applied by the storage battery.

[5] The lighting device according to any one of [1] to [4], wherein the lighting fixture has a shape, allowing extension thereof in the longitudinal direction thereof, and a plurality of the lighting fixtures are disposed in parallel with the longitudinal direction of the vehicle on the ceiling of the cabin in a state of one being extended to another, with the lighting fixture, the first light source being disposed on one side thereof, extending in the longitudinal direction thereof, and the second light source being disposed on the other side thereof.

Next, the functions based on the aspects of the inventions that are stated in the above items [1] to [5] will be explained.

According to the lighting device as stated in the above item [1], the lighting fixture is provided in order to wholly irradiate the inside of the cabin over the longitudinal direction of the vehicle. The lighting fixture includes the first light source and the second light source, which is lighted at an illuminance lower than that at which the first light source is lighted, and the irradiation from each light source is executed in order to wholly illuminate the inside of the cabin over the longitudinal direction of the vehicle as with that from a conventional general lamp, rather than to locally illuminate the inside of the cabin as with that from a conventional standby lamp.

With the lighting fixture, the first light source is supplied with electric power from the power supply not through the storage battery, while the second light source being supplied with electric power from the power supply through the storage battery. With the circuit and wiring for such lighting fixture, in an emergency, when the power fed from the power supply is shut off, the supply of electric power to the first light source is interrupted, the first light source being extinguished. On the other hand, the second light source is supplied with electric power from the battery, thereby the second light source being continued to be lighted at a low illuminance without being extinguished.

In this way, even if power fed from the power supply is shut off for some cause, the second light source can be continued to be lighted without performing a special switching operation or control. Herein, the second light source functions as a standby lamp to wholly irradiate the inside of the cabin over the longitudinal direction of the vehicle, whereby the passengers can safely evacuate if they are in any location in the inside of the cabin. The second light source is specified to be one, being lighted at a low illuminance also at the normal time, and of a type, consuming less power, compared to the first light source, thus the lighting thereof can be maintained over a period of time as long as possible within the predetermined range of capacity of the battery.

Further, with the wiring for supplying power from the power supply to the first light source and the wiring for supplying power from the power supply to the second light source, the parts of the wirings just ahead of the AC-DC conversion circuit can be unified into one for common use. Since the first light source and the second light source are included in the same lighting fixture, the length of the wiring can be reduced by the shortened distance between them, whereby the cost can be reduced with a substantial increase in weight being suppressed.

According to the lighting device as stated in the above item [2], with the lighting fixture, the irradiation direction of light from the first light source as a main illuminator is specified to be a certain direction, while the irradiation direction of light from the second light source as an auxiliary illuminator is specified to be a direction different from the direction specified for the first light source. The irradiation direction for each light source is not particularly limited, so long as it allows wholly illuminating the inside of the cabin over the longitudinal direction of the vehicle, however, by making the irradiation direction for one light source different from that for the other, illuminators having different applications can be realized even in a single lighting fixture.

According to the lighting device as stated in the above item [3], the power supply supplies electric power obtained from the outside of the vehicle to loads including the lighting fixture. With such power supply, it is possible to continuously and stably supply a predetermined quantity of electric power with no need for increasing the capacity in particular, always charging the battery, and the power supply can be widely used also as a power supply for supplying power to the loads other than the lighting fixture.

According to the lighting device as stated in the above item [4], the lighting device includes a conversion circuit, converting AC electric power from the power supply to output DC power, and the storage battery is charged with a DC voltage from the conversion circuit. Further, the second light source is lighted with the DC voltage applied by the storage battery. In this way, even if the electric current from the power supply is an alternating current, a storage battery, which is charged with a DC voltage, can be readily accommodated.

According to the lighting device as stated in the above item [5], the lighting fixture has a shape, allowing extension thereof in the longitudinal direction thereof, and a plurality of the lighting fixtures are disposed in parallel with the longitudinal direction of the vehicle on the ceiling of the cabin in a state of one being extended to another. Thereby, with a simple and convenient configuration, a plurality of the lighting fixtures can be easily arranged so as to wholly irradiate the inside of the cabin over the longitudinal direction of the vehicle.

In addition, with the lighting fixture, the first light source is disposed on one side thereof, extending in the longitudinal direction thereof, and the second light source is disposed on the other side thereof. Thereby, in a single lighting fixture, both the first light source and the second light source can be easily disposed such that different irradiation directions can be provided in any locations over the longitudinal direction of the vehicle.

With the lighting device according to the present invention, the brightness required for the entire vehicle in an emergency can be easily secured throughout the vehicle with a simple and convenient configuration, and the safety at the time of evacuation can be further improved with no need for increasing the cost.

BRIEF DESCRIPTION OF THE DRAWINGS

FIG. 1 is a block diagram schematically showing one example of a lighting device according to an embodiment of the present invention;

DETAILED DESCRIPTION OF THE PREFERRED EMBODIMENTS

Hereinbelow, an embodiment representing the present invention will be explained with reference to the drawings.

A lighting device 10 according to the present embodiment is a lighting device that is loaded in a vehicle for illuminating a cabin thereof. Herein, the vehicle refers to a variety of vehicles such as a railroad vehicle running on a track, a monorail vehicle, and a bus, however, hereinafter, a case where a lighting device 10 is loaded in a railroad vehicle 1 will be taken as an example for explanation.

Figure 2:
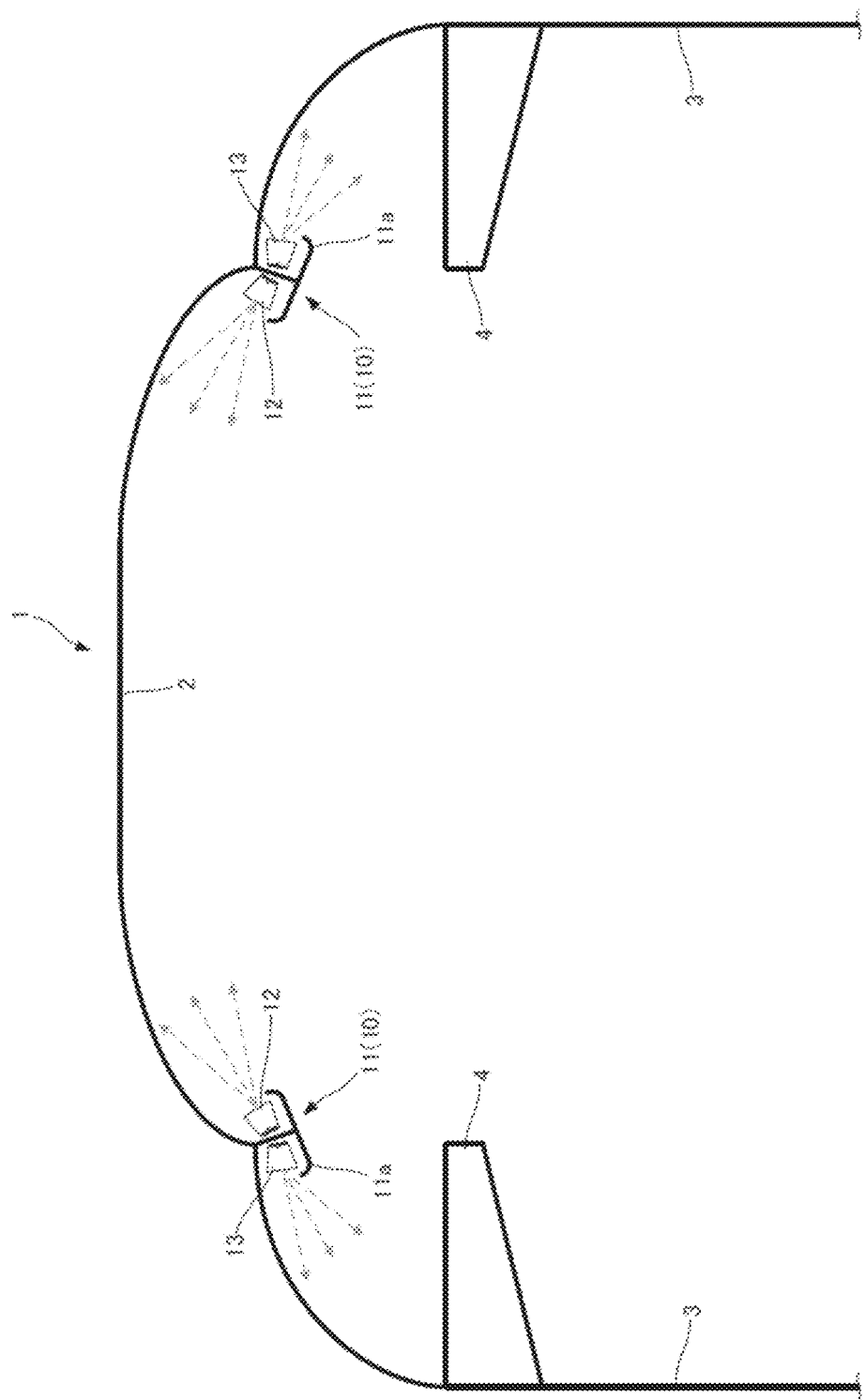
FIG. 2 is a cross sectional view schematically showing a top portion of a cabin of a railroad vehicle according to an embodiment of the present invention.
Figure 3:
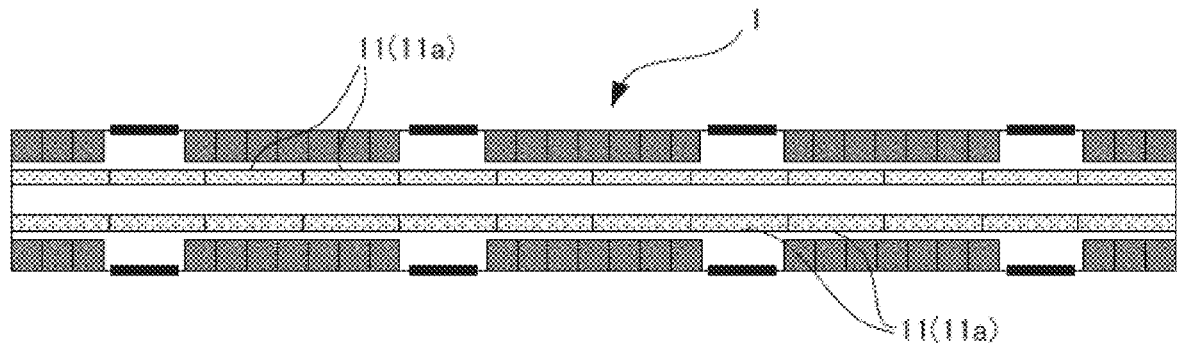
FIG. 3 is a schematic diagram schematically showing an arrangement of seats, doors, and a lighting device on the ceiling side in a cabin of a railroad vehicle according to an embodiment of the present invention.
Figure 3:
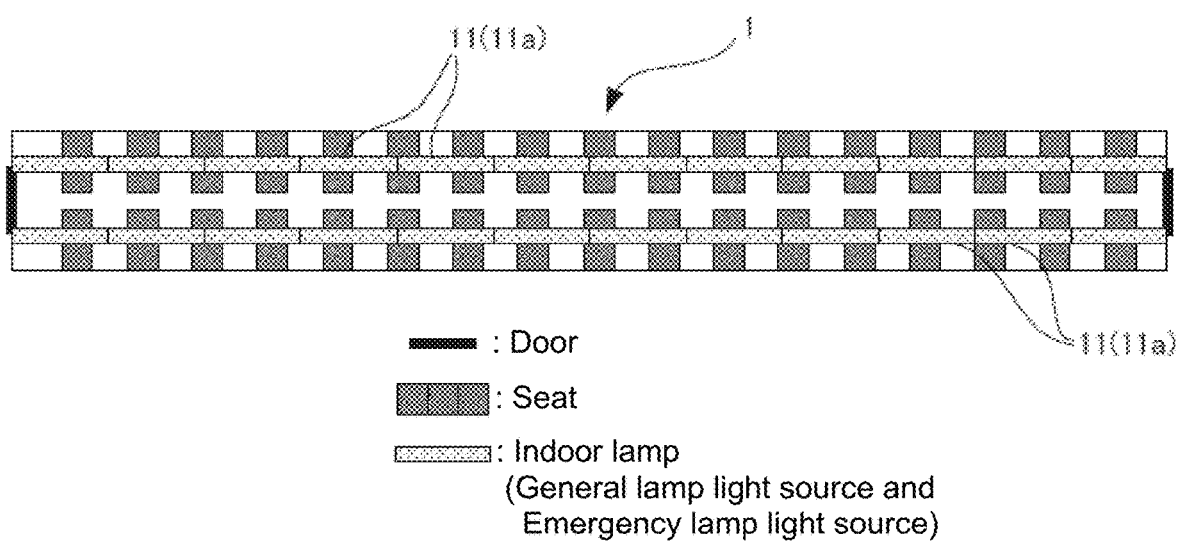

FIG. 1 is a block diagram schematically showing one example of a lighting device 10 that is loaded in a railroad vehicle 1. The railroad vehicle 1 is normally formed by a plurality of vehicles, consisting of a first vehicle having a crew room, and intermediate vehicles, however, the lighting device 10 that is loaded in one vehicle is taken as a representative for explanation. FIG. 2 is a cross sectional view schematically showing a top portion of the cabin of the railroad vehicle 1. FIG. 3 is a schematic diagram schematically showing an arrangement of the seats, the doors, and the lighting device 10 on a ceiling 2 in the cabin of the railroad vehicle 1.

As shown in FIG. 2, the lighting device 10 is disposed on the ceiling 2 in the cabin of the railroad vehicle 1, including a plurality of indoor lamps 11 as lighting fixtures. As shown in FIG. 3, the indoor lamp 11 has a shape that allows extension thereof in the longitudinal direction thereof, as later described, and the plurality of indoor lamps 11 are arranged on the ceiling 2 from one end thereof to the other in parallel with the longitudinal direction of the vehicle, being linearly connected with one another. Thereby, the indoor lamps 11 are arranged so as to wholly irradiate the inside of the cabin over the longitudinal direction of the vehicle.

As shown in FIG. 3, the arrangement of the seats, etc. in the cabin of the railroad vehicle 1 varies, depending upon the type of vehicle, such as the commuter train or the limited express train, as described in connection with the background art. In the railroad vehicle 1 of any type, the indoor lamps 11 are disposed in such a way that they are arranged in two rows on the right and left sides about the center line of the vehicle that extends along the longitudinal direction thereof, each in a location closer to a side wall 3 on the ceiling 2. Thus, the indoor lamps 11 are disposed such that the required illuminance can be secured in the cabin also in a crosswise direction of the vehicle.

As shown in FIG. 1, in addition to a plurality of indoor lamps 11, which are arranged so as to wholly irradiate the inside of the cabin over the longitudinal direction of the vehicle, the lighting device 10 includes such components as a vehicle body power supply (power supply) 20, which supplies electric power to the respective indoor lamps 11, and a battery (storage battery) 30, which is charged with a voltage applied by the vehicle body power supply 20. Herein, in the case where the railroad vehicle 1 is formed by a plurality of vehicles, the indoor lamps 11 and the battery 30 are disposed in the same manner in each vehicle, however, it is enough that the vehicle body power supply 20 is provided only for one vehicle, such as the first vehicle.

With the indoor lamp 11, one unit that constitutes each individual lighting fixture includes a general lamp light source 12 as a first light source, and a standby lamp light source 13 as a second light source, which is lighted at an illuminance lower than that at which the general lamp light source 12 is lighted. In FIG. 1, the general lamp light source 12 and the standby lamp light source 13 in the indoor lamp 11 are illustrated separately for convenience, however, those light sources 12 and 13 are collectively incorporated in each indoor lamp 11 provided as one unit.

As shown in FIG. 2 and FIG. 3, the indoor lamp 11 includes a casing 11a, having a shape allowing extension in the longitudinal direction thereof, and as described above, a plurality of the respective indoor lamps 11 are disposed in parallel with the longitudinal direction of the vehicle on the ceiling 2 of the cabin in a state of one being extended to another. With the indoor lamp 11, the general lamp light source 12 is disposed on one side of the casing 11a that extends in the longitudinal direction thereof, being located closer to the inside of the cabin than the center line of the casing 11a, while the standby lamp light source 13 of the indoor lamps 11 being disposed on the other side of the casing 11a that extends in the longitudinal direction thereof, being located closer to the outside of the cabin than the center line of the casing 11a.

With the indoor lamp 11, which has such a configuration, the irradiation direction of the general lamp light source 12 is established to be a direction toward the center of the ceiling 2, which is a predetermined irradiation direction therefor. Further, the irradiation direction of the standby lamp light source 13 is specified to be a direction toward the upper portion of the side wall 3, which is a direction different from that for the general lamp light source 12. Thus, the general lamp light source 12 illuminates the whole of the inside of the cabin with indirect light from the ceiling 2 as a main illuminator. In addition, the standby lamp light source 13 illuminates the inside of a luggage rack 4, which is provided in the upper portion of the side wall 3, with direct light as an auxiliary illuminator.

The indoor lamp 11 shown in FIG. 2 gives only one example of lighting fixture, however, any lighting fixture with any configuration is disposed in order to wholly irradiate the inside of the cabin over the longitudinal direction of the vehicle. Herein, "in order to wholly irradiate the inside of the cabin over the longitudinal direction of the vehicle", it is not always necessary for a plurality of the indoor lamps 11 to be disposed in a state in which one is extended to another, and even if a plurality of the indoor lamps 11 were disposed at a predetermined interval, a state in which the light from the plurality of the indoor lamps 11 irradiates almost uniformly in a contiguous manner in the inside of the cabin over the longitudinal direction of the vehicle can be achieved.

The particular number of indoor lamps 11 is a design matter to be determined in accordance with the size of the individual unit and the size of the vehicle. In FIG. 1, one general lamp light source 12 and one standby lamp light source 13 are shown for convenience of explanation, however, as described above, actually, a plurality of indoor lamps 11, the number thereof having been determined as appropriate, are arranged in each vehicle in the same manner. To the indoor lamp 11, a control device (not shown) is connected such that a variety of signals can be transmitted thereto or received therefrom. The control device executes lighting control, such as dimming, of the light sources 12 and 13.

The illuminance of the standby lamp light source 13 may be lower than that of the general lamp light source 12 to such a degree that, in an emergency, the light emitted from the standby lamp light source 13 toward the floor allows the passengers to identify their feet. The standby lamp 13 is not such a one like a conventional standby lamp, which is installed only in the vicinity of the door, and in an emergency, locally illuminates only the area near the door brightly, but a one that, even if darker, can wholly irradiate the inside of the cabin over the longitudinal direction of the vehicle. Assuming that the illuminance of the general lamp light source 12 at the normal time is 100%, for example, the illuminance of the standby lamp light source 13 can be set at as low as 10 to 20%.

As the general lamp light source 12 and the standby lamp light source 13, LED is suitable for use. The LED offers such advantages as not only it being easy to be controlled for dimming and color matching, but also it being compact, consuming less power, and having a long service life. Specifically, the light sources 12 and 13 are configured by mounting a plurality of them on a narrow substrate at equal intervals, for example. The LED emits light within a predetermined angular range of irradiation about the optical axis thereof, and the orientation of the optical axis determines the irradiation direction. The light sources 12 and 13 are not always limited to the LED, but as them, such a part as a small-sized electric bulb may be adopted.

The vehicle body power supply 20 supplies electric power to the indoor lamps 11, being normally loaded in one vehicle, such as the first one, with a wiring for supplying electric power to each vehicle being extended therefrom. The vehicle body power supply 20 is configured such that it is supplied with electric power from outside, for example, from an overhead contact line through a pantograph, or the like, and supplies electric power not only to the indoor lamps 11, but also to the other loads. Herein, the loads other than the indoor lamps 11 refer to such components as door opening and closing apparatuses and information displays (monitors).

The vehicle body power supply 20 supplies an alternating current to the loads including the indoor lamps 11, and with the wiring for the lighting device 10, the alternating current is supplied to the general lamp light source 12 as it is, while, to the standby lamp light source 13, a direct current, which is provided as a result of converting the alternating current by the later-described AC-DC conversion circuit 21, being supplied through the battery 30. In case where the vehicle body power supply 20 supplies a direct current, the configuration shown in FIG. 1 will be altered depending upon the condition for supply of the direct current.

The battery 30 is, for example, a storage battery that is provided by connecting a plurality of battery cells in series, and thereto, an AC-DC conversion circuit 21 is attached. To or from the battery 30, a direct current at a low voltage that is obtained as a result of conversion by the AC-DC conversion circuit 21 is inputted or outputted. Herein, the AC-DC conversion circuit 21 is a circuit that converts the alternating current supplied from the vehicle body power supply 20 into a direct current at a low voltage, and outputs it for charging the battery 30. The battery 30 is disposed under the floor of each vehicle, for example.

As shown in FIG. 1, with the lighting device 10, the circuit and wiring for the indoor lamp 11 is configured such that, to the general lamp light source 12 of the indoor lamp 11, electric power is supplied from the vehicle body power supply 20 not through the battery 30, while, to the standby lamp light source 13, electric power is supplied from the vehicle body power supply 20 through the battery 30. Herein, components, such as a switch for switching over the power feeding to that from the battery 30, and a circuit for dimming control of the light sources 12 and 13, are not provided in particular.

With the circuit and wiring for such indoor lamp 11, in an emergency, when the power fed from the vehicle body power supply 20 is shut off, electric power is supplied from the battery 30 only to the standby lamp light source 13 so as to maintain the lighting of the standby lamp light source 13 at a low illuminance, which is also given at the normal time. Shutoff of the power fed from the vehicle body power supply 20 occurs from such a cause as cutting off of the overhead contact line or a failure of the pantograph.

Next, the functions of the lighting device 10 according to the present embodiment will be explained.

With the present lighting device 10, the indoor lamp 11, which illuminates the inside of the cabin of the railroad vehicle 1, is provided in order to wholly irradiate the inside of the cabin over the longitudinal direction of the vehicle. The indoor lamp 11 can be extended to a desired length by linearly connecting a plurality of the casings 11a, extending in the longitudinal direction thereof, one with another, whereby the indoor lamps 11 can be disposed on the ceiling 2 in parallel with the longitudinal direction of the vehicle from one end thereof to the other. Thereby, the indoor lamps 11 can irradiate the entire inside of the cabin over the longitudinal direction of the vehicle. The indoor lamps 11 are arranged in two rows such that they are symmetrically disposed about the center line of the ceiling 2, whereby they can illuminate the inside of the cabin in a wide range with a good balance from both right and left sides.

The indoor lamp 11 includes the general lamp light source 12 and the standby lamp light source 13, which is lighted at an illuminance lower than that at which the general lamp light source 12 is lighted. The irradiation by the general lamp light source 12 and that by the standby lamp light source 13 are both executed in order to wholly illuminate the inside of the cabin over the longitudinal direction of the vehicle as with that by the conventional general lamp, and are not executed to locally illuminate only the area in the vicinity of the door inside of the cabin as with that by the conventional standby lamp. The illuminance of the standby lamp light source 13 can be as low as, for example, 10 to 20% of that of the general lamp light source 12, in other words, it may be low to such a degree that the light emitted from the standby lamp light source 13 toward the floor allows the passengers to identify their feet in an emergency.

The irradiation direction for the general lamp light source 12 is specified to be a direction toward the center of the ceiling 2, and at the normal time, the general lamp light source 12 illuminates the whole of the inside of the cabin with indirect light from the ceiling 2 as a main illuminator. On the other hand, the irradiation direction for the standby lamp light source 13 differs from that for the general lamp light source 12, being specified to be a direction toward the upper portion of the side wall 3, and the standby lamp light source 13 illuminates the inside of the luggage rack 4 installed in the upper portion of the side wall 3 with direct light as an auxiliary illuminator. In this way, by providing the light from the light source 12 and that from the light source 13 with different irradiation directions, illuminators having different applications can be realized even in a single indoor lamp 11.

As shown in FIG. 1, with the indoor lamp 11, the general lamp light source 12 is supplied with electric power from the vehicle body power supply 20 not through the battery 30. On the other hand, the standby lamp light source 13 is supplied with electric power from the vehicle body power supply 20 through the battery 30. With such circuit and wiring for the indoor lamp 11, in an emergency, when the power fed from the vehicle body power supply 20 is shut off, the supply of electric power to the general lamp light source 12 is interrupted, the general lamp light source 12 being extinguished.

On the other hand, the standby lamp light source 13 is supplied with electric power from the battery 30, thereby the standby lamp light source 13 being continued to be lighted at a low illuminance without being extinguished.

In this way, in an emergency, the routes of supply of electric power to the general lamp light source 12 and the standby lamp light source 13 will not be switched over from one to another by the switching operation and the control thereof, and the operation and the control thereof for selecting only a part of the general lamp light sources 12 and that of the standby lamp light sources 13 for lighting them will not be performed. In a state in which the power fed from the vehicle body power supply 20 is shut off, there is the possibility that even the electric power required for performing such a special operation and the control thereof may not be able to be supplied. Contrarily, with the standby lamp light source 13, the lighting thereof can be maintained with no need for making a special switching operation and the control thereof by means of a control device.

Figure 4:
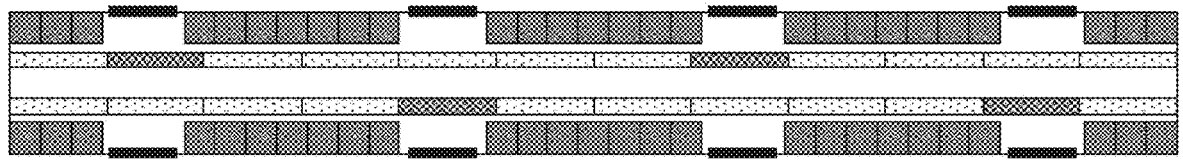
FIG. 4 is a schematic diagram schematically showing an arrangement of seats, doors, and a lighting device on the ceiling side in a cabin of a conventional railroad vehicle.
Figure 4:
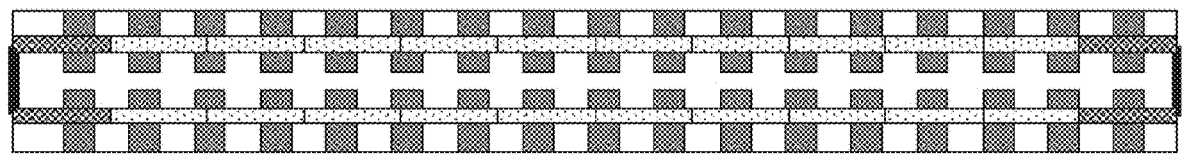

As shown in FIG. 4(b), with the arrangement of the indoor lamps in a conventional limited express train, the standby lamp is disposed only at the vehicle end.

Figure 5:
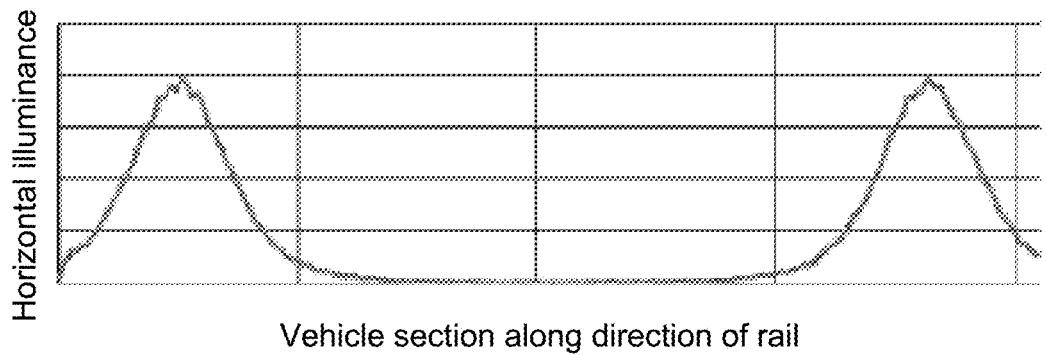
FIG. 5 gives a graph showing the illuminance distribution in a cabin of a railroad vehicle in an emergency for a lighting device according to an embodiment of the present invention, and a graph showing that for a conventional lighting device.
Figure 5:
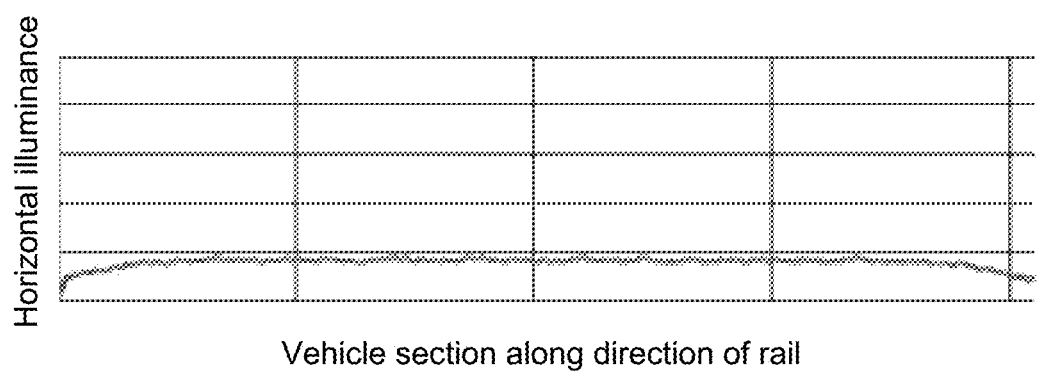

Therefore, as can been seen from FIG. 5(a), which indicates the illuminance distribution (that in the vehicle section along the direction of the rail) for the conventional lighting device, the illuminance in the inside of the cabin along the longitudinal direction in an emergency with the conventional lighting device has been bright only in the area in the vicinity of the cabin entrance at the vehicle end, while, in the area especially at the center of the vehicle, the illuminance has been dark, thereby the difference in illuminance between the area at the vehicle end and the areas other than that at the vehicle end having been great. Thus, with the conventional lighting device, the illuminance difference between the area in the vicinity of the vehicle end, where the standby lamp is installed, and the area at the center of the vehicle, which is away from the standby lamp, has been great, thereby the passengers in the dark area being difficult to identify their feet when they make evacuation, and thus there has been a room for improvement of the safety at the time of evacuation.

As shown in FIGS. 3(a) and 3(b), according to the present lighting device 10, the standby lamp light source 13, which is included in every indoor lamp 11 in any vehicle, will function as a standby lamp in an emergency to wholly irradiate the inside of the cabin over the longitudinal direction of the vehicle even though at a low illuminance. Thereby, as shown in FIG. 5(b), the uniformity in illuminance in the inside of the cabin in an emergency is improved as compared to that with the conventional lighting device, whereby a minimum illuminance that is required for the passengers to evacuate from the inside of the cabin can be secured over the longitudinal direction of the vehicle, and the passengers, even if being in any location in the inside of the cabin, can evacuate safely.

However, since the standby lamp light source 13 is supplied with power from the battery 30 in an emergency, the duration of illumination is limited by the capacity of the battery, and in the case where the supply of power from the vehicle body power supply 20 is shut off for a long period of time, there is the possibility that the lighting of the standby lamp light source 13 may not be able to be maintained. Then, with the present lighting device 10, the standby lamp light source 13 is specified to be of a power saving type, which provides lighting at a low illuminance also at the normal time, whereby the lighting thereof can be maintained over a period of time as long as possible within the predetermined range of capacity of the battery 30. For example, both in the case where two general lamp light sources 12 are lighted at 100% and in the case where twenty standby lamp light sources 13 are lighted at 10%, it can be considered that the power consumption is the same in both cases.

The relation between the capacity of the battery 30 and the illuminance of the standby lamp light source 13 can be established such that, in the event that the supply of power from the vehicle body power supply 20 is suddenly shut off, the lighting of the standby lamp light source 13 can be maintained for a period of 30 minutes with the power supplied from the battery 30, which is always charged to 100% at the normal time. Even in an emergency, the condition of power feeding from the battery 30 to the standby lamp light source 13 will not be subjected to any change or switched over. If it is possible to be implemented only with the configuration of the circuit itself with no need for performing a special control with the control device, the illuminance may be automatically changed over to, for example, a further low one in an emergency.

Further, with the wiring for supplying power from the vehicle body power supply 20 to the general lamp light source 12 and the wiring for supplying power from the vehicle body power supply 20 to the standby lamp light source 13, the parts of the wirings just ahead of the AC-DC conversion circuit 21 can be unified into one for common use. Since the general lamp light source 12 and the standby lamp light source 13 are included in the same indoor lamp 11, the length of the wiring can be reduced by the shortened distance between them, whereby the cost can be reduced with a substantial increase in weight being suppressed. Therefore, the need for disposing a wiring for exclusive use by the standby lamp behind the ceiling 2 of the cabin at the time of manufacturing the railroad vehicle 1 as with the conventional lighting device is eliminated, thereby more allowance for space being created behind the ceiling 2, with the weight and cost being able to be reduced.

Furthermore, with the present lighting device 10, the vehicle body power supply 20 supplies electric power obtained from the outside of the vehicle to the loads including the indoor lamp 11. With such vehicle body power supply 20, it is possible to continuously and stably supply a predetermined quantity of electric power with no need for increasing the capacity in particular, always charging the battery 30, and the vehicle body power supply 20 can be widely used also as a vehicle body power supply for supplying power to the loads other than the indoor lamp 11.

In addition, the wiring and circuit for the standby lamp light source 13 includes the AC-DC conversion circuit 21, which converts the alternating current from the vehicle body power supply 20 to output a direct current, the battery 30 being charged with a DC voltage from the AC-DC conversion circuit 21. Then, the standby lamp light source 13 is lighted with the DC voltage applied by the battery 30. In this way, even if the electric current from the vehicle body power supply 20 is an alternating current, a storage battery, which is charged with a DC voltage, can be readily accommodated.

Heretofore, the embodiment of the present invention has been described with reference to the drawings, however, the specific configuration is not limited to that of the embodiment as described above, and various changes and modifications may be included in the present invention, so long as they do not depart from the spirit and scope thereof.

For example, in the above description, the indoor lamp 11 of the lighting device 10 is that which is installed on the ceiling 2 in the inside of the cabin of the railroad vehicle 1, however, it may be that which is installed as an illuminator in the inside of the cabin of any other vehicle, such as a monorail car or a bus. In addition, the specific geometry of the indoor lamp 11 is not limited to the example which is shown.

The present invention is widely applicable to a lighting device that is loaded in vehicles, such as the railroad vehicle, and is used to illuminate the inside of the cabin of the vehicle.

Reference numeral 1 denotes a railroad vehicle; 2 a ceiling; 3 a side wall; 4 a luggage rack; 10 a lighting device; 11 an indoor lamp (lighting fixture); 11a a casing; 12 a general lamp light source (first light source); 13 a standby lamp light source (second light source); 20 a vehicle body power supply (power supply); 21 an AC-DC conversion circuit (conversion circuit); and 30 a battery (storage battery).

What is claimed is:

1. A lighting device to be disposed in a vehicle to illuminate an inside of a cabin, comprising:
    a lighting fixture to be disposed in the cabin of the vehicle to illuminate the inside of the cabin over a longitudinal direction of the vehicle,
    a power supply for supplying electric power to the lighting fixture, and
    a storage battery to be charged with the power supply,
    wherein said lighting fixture includes a plurality of light source units,
    each of said light source units includes a first light source and a second light source integrated with the first light source,
    said first light source is disposed along the longitudinal direction of the vehicle only on one side relative to a center line of the lighting fixture, being located closer to the inside of the cabin than the center line of the lighting fixture,
    said second light source is disposed along the longitudinal direction of the vehicle only on the other side near a sidewall of the cabin relative to the center line of the lighting fixture,
    said first light source is configured to illuminate in a first direction toward a ceiling of the cabin,
    said second light source is configured to illuminate in a second direction different from the first direction toward a floor of the cabin,
    said second light source has a low illuminance lower than that of the first light source,
    said first light source is configured to receive electric power from the power supply not through the storage battery,
    said second light source is configured to receive electric power from the power supply through the storage battery, and
    when the power supply is shut off, said storage battery supplies electric power to the second light source so that the second light source continues to illuminate at the low illuminance, allowing passengers to see their feet.

2. The lighting device according to claim 1, wherein said power supply is configured to receive electric power from an external source.

3. The lighting device according to claim 1, further comprising a conversion circuit for converting AC electric power to DC electric power,
    wherein said storage battery is charged with the DC electric power from the conversion circuit, and
    said second light source illuminates with the DC electric power from the storage battery.

4. The lighting device according to claim 1, wherein said lighting fixture has an elongated shape so that the lighting fixtures is aligned with the longitudinal direction of the vehicle when the lighting fixture is disposed on the ceiling of the cabin.

* * * * *